(12) United States Patent
Yachin et al.

(10) Patent No.: US 12,053,687 B2
(45) Date of Patent: *Aug. 6, 2024

(54) PERFORMANCE EVALUATION EQUIPMENT, SYSTEMS AND RELATED METHODS

(71) Applicant: LUDUS MATERIALS LTD., Givat Brenner (IL)

(72) Inventors: Nir Yachin, Givat Brenner (IL); Amit Kinor, Givat Brenner (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,892

(22) Filed: Feb. 16, 2023

(65) Prior Publication Data

US 2023/0191232 A1 Jun. 22, 2023

Related U.S. Application Data

(62) Division of application No. 17/289,234, filed as application No. PCT/IL2019/051215 on Nov. 6, 2019, now Pat. No. 11,583,750.

(60) Provisional application No. 62/755,600, filed on Nov. 5, 2018, provisional application No. 62/927,710, filed on Oct. 30, 2019.

(51) Int. Cl.
*A63B 71/06* (2006.01)
*A63B 24/00* (2006.01)
*A63B 69/20* (2006.01)
*A63B 69/26* (2006.01)
*A63B 69/32* (2006.01)

(52) U.S. Cl.
CPC ...... *A63B 71/0622* (2013.01); *A63B 24/0075* (2013.01); *A63B 24/0084* (2013.01); *A63B 69/20* (2013.01); *A63B 69/26* (2013.01); *A63B 69/32* (2013.01); *A63B 2071/0625* (2013.01); *A63B 2220/40* (2013.01); *A63B 2220/62* (2013.01); *A63B 2220/73* (2013.01); *A63B 2220/833* (2013.01); *A63B 2225/20* (2013.01); *A63B 2225/50* (2013.01); *A63B 2225/74* (2020.08); *A63B 2244/10* (2013.01)

(58) Field of Classification Search
None
See application file for complete search history.

(56) References Cited

U.S. PATENT DOCUMENTS

| | | |
|---|---|---|
| 5,694,939 A | 12/1997 | Cowings |
| 2001/0040591 A1 | 11/2001 | Abbott |
| 2009/0189982 A1 | 7/2009 | Tawiah |
| 2013/0130843 A1* | 5/2013 | Burroughs ............ G01S 13/751 473/415 |
| 2015/0306484 A1 | 10/2015 | Nussbaum |
| 2017/0304705 A1 | 10/2017 | Hermandorfer |
| 2017/0319931 A1 | 11/2017 | Yachin |

FOREIGN PATENT DOCUMENTS

WO 20142809 A2 6/2001

* cited by examiner

*Primary Examiner* — Kevin Y Kim
(74) *Attorney, Agent, or Firm* — JMB DAVIS BEN-DAVID

(57) ABSTRACT

This disclosure relates to using a hand held target (e.g. tae kwon do paddle) as a tool for providing physical performance instructions according to a digital workout performance template loaded in advance.

3 Claims, 6 Drawing Sheets

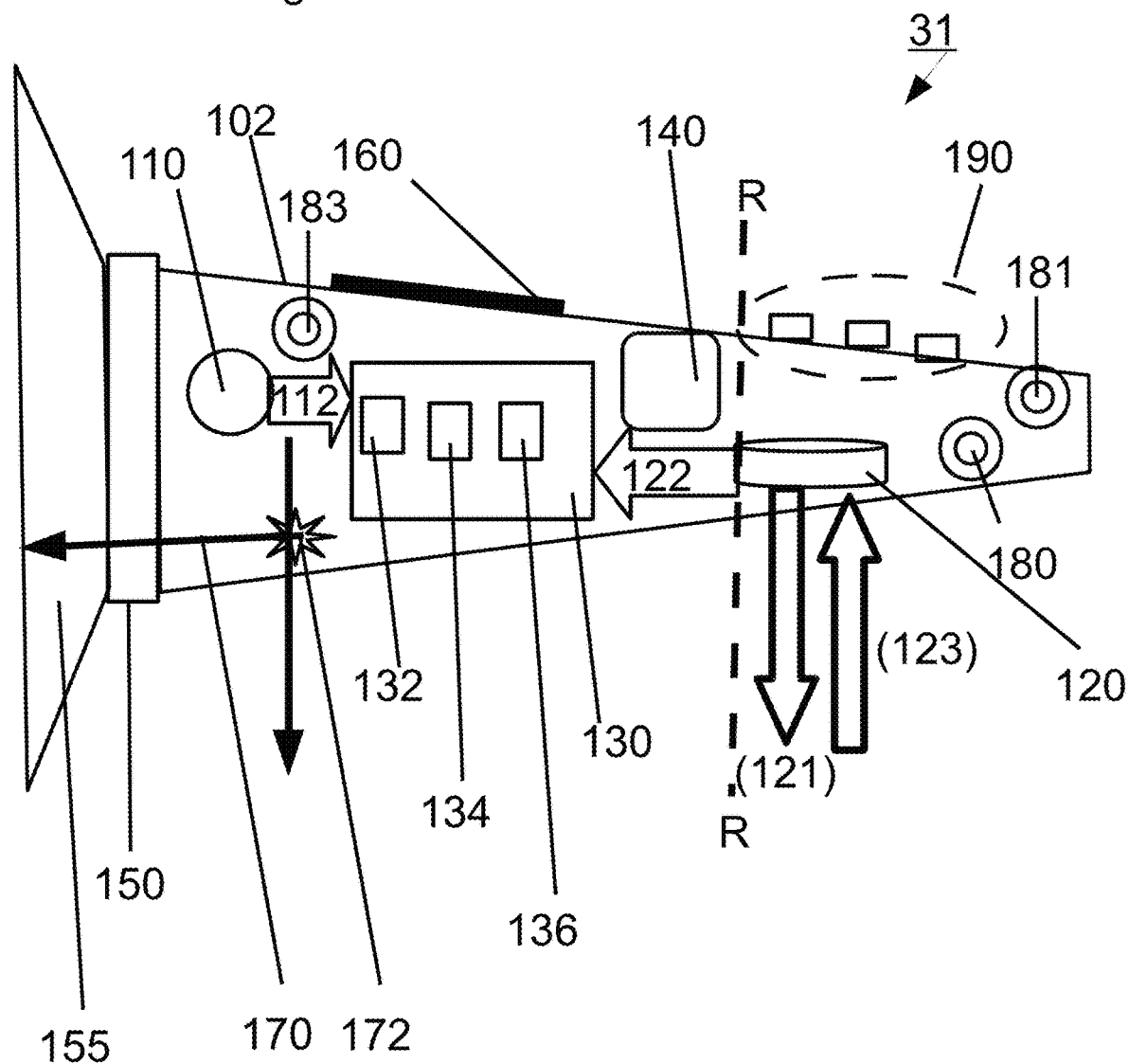

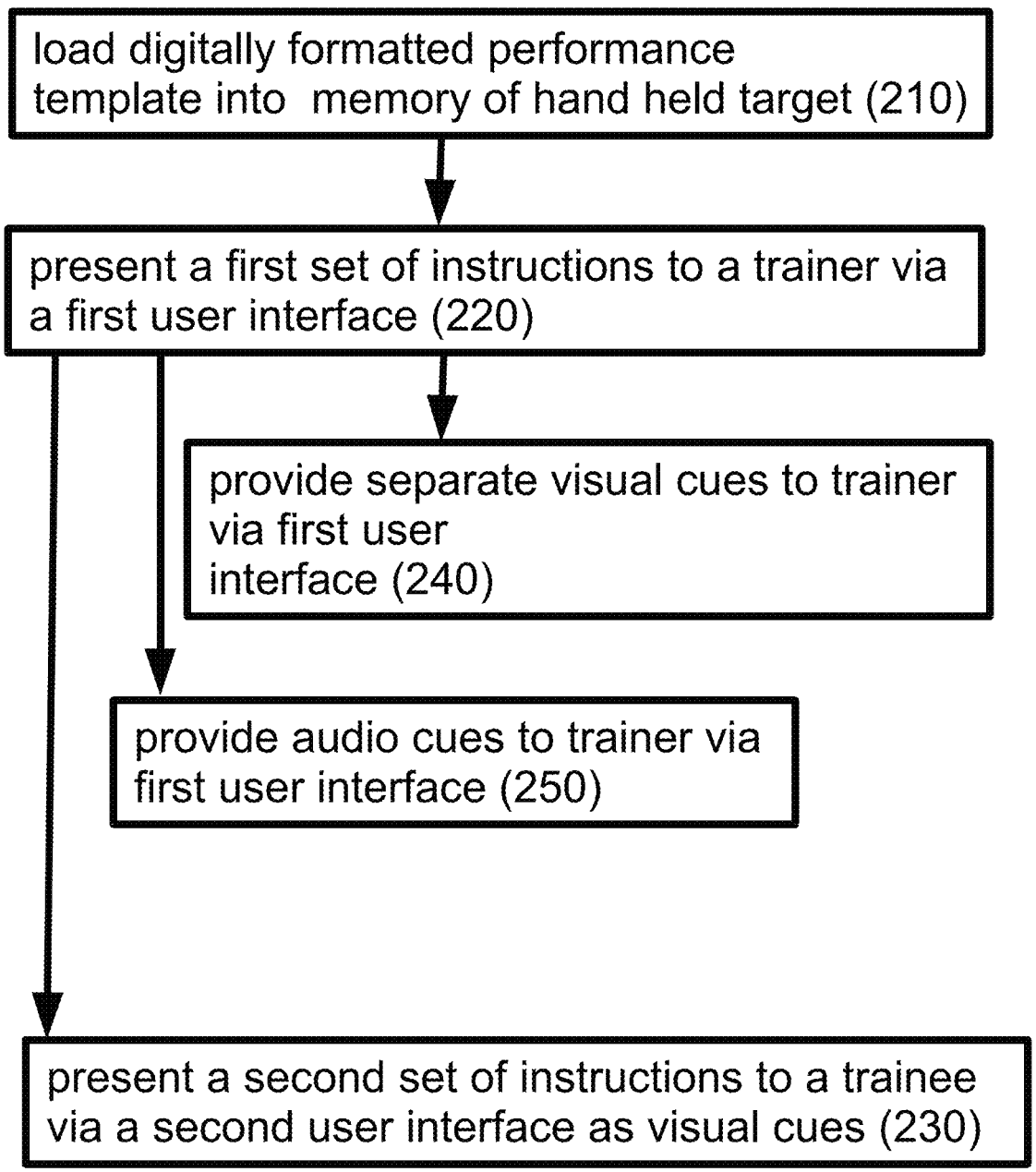

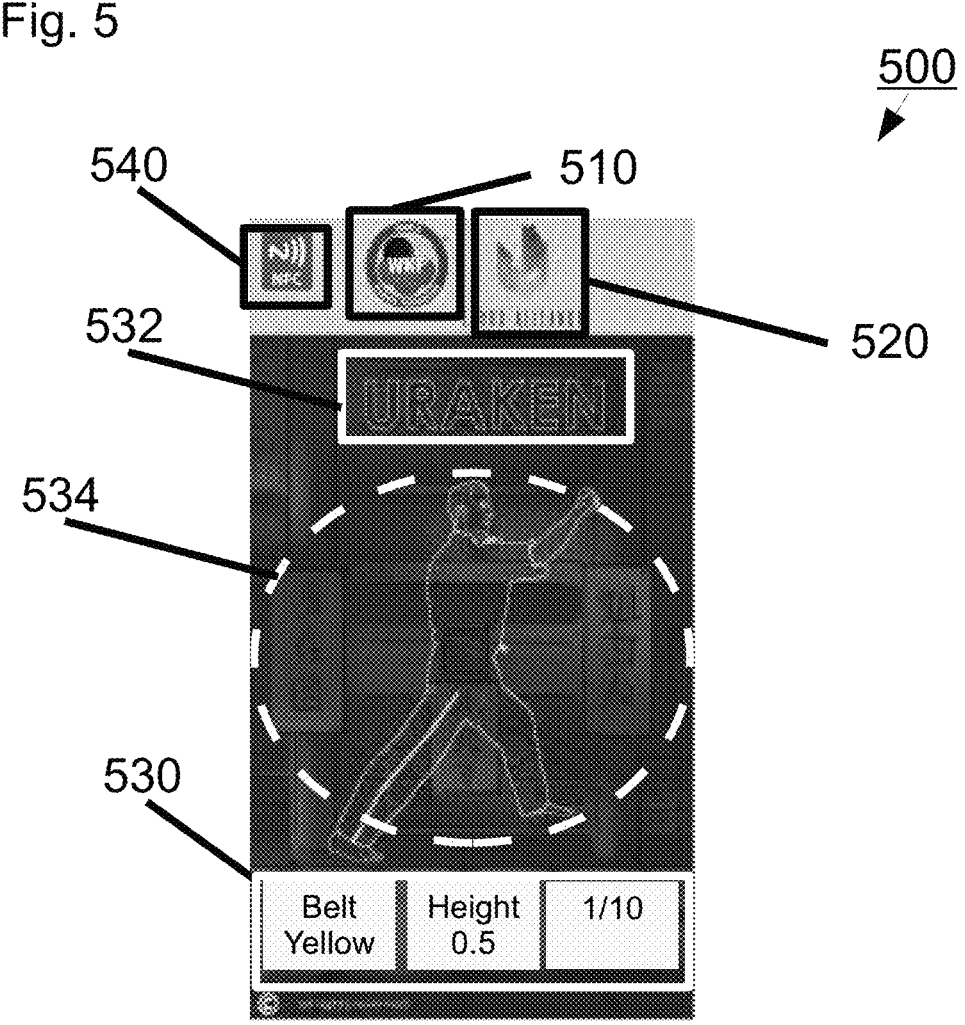

PERFORMANCE EVALUATION EQUIPMENT, SYSTEMS AND RELATED METHODS

DETAILS OF RELATED APPLICATIONS

This is a divisional patent application of U.S. patent application Ser. No. 17/289,234 filed on Apr. 28, 2021, which is the U.S. National Stage of International Application No. PCT/IL2019/051215 filed Nov. 6, 2019, which in turn claims the benefit of U.S. Provisional Patent Application No. 62/755,600, filed on Nov. 5, 2018 and U.S. Provisional Patent Application No. 62/927,710, filed on 30 Oct. 2019.

Each of these earlier applications is fully incorporated herein by reference.

FIELD OF THE INVENTION

The various described embodiments are in the field of monitoring physical performance.

BACKGROUND OF THE INVENTION

With the advent of a global economy, sports enthusiasts are more likely than ever to travel to compete.

In tae kwon do it is common for a trainer or coach to use a hand held paddle as a target. The student or trainee attempts to kick the paddle as it is raised, lowered and moved from side to side by the trainer or coach. WO 2017/046800 (also published as US 2018/0272219 which is fully incorporated herein by reference) describes a paddle including an altimeter and an accelerometer.

SUMMARY OF THE INVENTION

A broad aspect of the invention relates standardizing performance data to facilitate objective comparison.

One aspect of some embodiments of the invention relates to using a hand held target (e.g. tae kwon do paddle) as a tool for providing physical performance instructions according to a digital workout performance template loaded in advance. In some exemplary embodiments of the invention, a single template provides one set of instructions to a trainer holding the target and a second set of instructions to a trainee attempting to strike the target. In some exemplary embodiments of the invention, each set of instructions is presented via a separate user interface. Alternatively or additionally, in some embodiments one or both user interfaces provide visual cues. Alternatively or additionally, in some embodiments one or both user interfaces provide audio cues. In some exemplary embodiments of the invention, loading of the digital workout performance template relies on data transfer employing Bluetooth and/or Near Field Contact (NFC) and/or United Serial Bus (USB) and/or Ethernet and/or Wi-Fi.

According to various exemplary embodiments of the invention, the source of the digital workout performance template includes one or more of a sports association, an acknowledged champion and a therapy practitioner.

Another aspect of some embodiments of the invention relates to a hand held target (e.g. tae kwon do paddle) equipped with a data port for loading a digital workout performance template and a trainer user interface which presents trainer instructions to a trainer holding the target in accord with the digital workout performance template. In some exemplary embodiments of the invention, the trainer user interface presents trainer instructions to a trainer holding the target in via a visual display and/or via an audio output interface. In some exemplary embodiments of the invention, the target also includes a trainee user interface that provides trainee cues in accord with the digital workout performance template. Alternatively or additionally, in some embodiments the target includes trainee login hardware. In some exemplary embodiments of the invention, the data port facilitates data transfer employing Bluetooth and/or Near Field Contact (NFC) and/or United Serial Bus (USB) and/or Ethernet and/or Wi-Fi.

A third aspect of some embodiments of the invention relates to a hand held target (e.g. tae kwon do paddle) equipped with a data port for loading a digital workout performance template and a trainee user interface which presents trainee instructions to a trainee attempting to strike the target in accord with the digital workout performance template. In some embodiments, the target includes trainee login hardware. In some exemplary embodiments of the invention, the target includes an accelerometer, a clock and an altimeter. According to these embodiments, the clock time stamps the trainee instructions, accelerometer data and altimeter data. In some exemplary embodiments of the invention, a second trainer user interface presents trainer instructions to a trainer holding the target via a visual display and/or via an audio output interface. In some exemplary embodiments of the invention, the data port facilitates data transfer employing Bluetooth and/or Near Field Contact (NFC) and/or United Serial Bus (USB) and/or Ethernet and/or Wi-Fi.

A fourth aspect of some embodiments of the invention relates to a computerized system storing a relational database of trainee IDs, digitally formatted performance templates and performance data from trainees trained using the performance templates. In some exemplary embodiments of the invention, the system includes a channel of communication receiving data from a plurality of handheld targets as described in previous aspects. Alternatively or additionally, in some embodiments the system includes a search engine configured to receive and respond to queries based on trainee ID and/or performance templates A fifth aspect of some embodiments of the invention relates to a personalized avatar including a digital graphic representation of a trainee and an animation engine for the digital graphic representation. In some exemplary embodiments of the invention, the animation engine is powered by performance data of the trainee in one or more performance templates. In some exemplary embodiments of the invention, performance data is retrievable from a database.

A sixth aspect of some embodiments of the invention relates to a tangible machine-readable media including textual and/or graphic information identifying a specific performance template and a digitally formatted performance template. In some exemplary embodiments of the invention, the digitally formatted performance template includes a first set of instructions to a trainer and a second set of instructions to a trainee. In some embodiments, the first set and the second set of instructions are formatted for presentation on first and second user interfaces respectively. In some exemplary embodiments of the invention, the tangible machine-readable media includes data transfer hardware.

A seventh aspect of some embodiments of the invention relates to virtual competitions in which competitors from multiple locations each compete against a same digital workout performance template on a same day. In some embodiments, the digital workout performance template is presented via a tae kwon do paddle. According to these embodiments, performance data for each of the competitors from multiple locations is displayed on a common leader board. In some embodiments, use of a common leader board contributes to an ability to compare performance of competitors from different locations on a same day. In some embodiments, the leader board is available via an a app on a smartphone or tablet. Alternatively or additionally, in some embodiments the leaderboard is displayed at locations where the competitors are competing.

It will be appreciated that the various aspects described above relate to solution of technical problems associated with dissemination of training instructions from an expert in a specific geographic location to trainees located far from that geographic location.

Alternatively or additionally, it will be appreciated that the various aspects described above relate to solution of technical problems related to standardization of performance data pertaining to trainees trained in different locations by different trainers.

Alternatively or additionally, it will be appreciated that the various aspects described above relate to solution of technical problems related to representation of a trainee as an animated computerized graphic image in a way that accurately reflects their performance capability.

In some exemplary embodiments of the invention there is provided a method of providing physical performance instructions including: (a) loading a digitally formatted performance template into a memory of a hand held target; (b) presenting a first set of instructions to a trainer via a first user interface; and (c) presenting a second set of instructions to a trainee via a second user interface as visual cues. In some exemplary embodiments of the invention, the method includes providing separate visual cues to the trainer via the first user interface. Alternatively or additionally, in some embodiments the method includes providing audio cues to the trainer via the first user interface. Alternatively or additionally, in some embodiments the loading includes a data transfer employing at least one communication protocol selected from Bluetooth, Near Field Contact (NFC), United Serial Bus (USB), Ethernet and Wi-Fi. Alternatively or additionally, in some embodiments the digitally formatted performance template is provided by at least one entity selected from the group consisting of a sports association, an acknowledged champion and a therapy practitioner.

In some exemplary embodiments of the invention there is provided a hand held target including: (a) a data port in communication with a memory configured to receive and store a digitally formatted performance template; (b) a trainer user interface designed and configured to present trainer instructions to a trainer holding the target in accord with the digitally formatted performance template. In some exemplary embodiments of the invention, the trainer user interface includes a display. Optionally, the display provides visual cues to the trainer. Alternatively or additionally, in some embodiments the trainer user interface includes an audio output interface. Optionally, the audio output interface provides audio cues to the trainer. Alternatively or additionally, in some embodiments the hand held target includes a trainee user interface that provides trainee cues in accord with the digitally formatted performance template. Alternatively or additionally, in some embodiments the hand held target includes trainee login hardware. Alternatively or additionally, in some embodiments the data port is compatible with at least one communication protocol selected from Bluetooth, Near Field Contact (NFC), United Serial Bus (USB), Ethernet and Wi-Fi.

In some exemplary embodiments of the invention there is provided a hand held target including: (a) a data port in communication with a memory configured to receive and store a digitally formatted performance template; and (b) a trainee user interface designed and configured to present trainee instructions to a trainee in accord with the digitally formatted performance template. In some exemplary embodiments of the invention, the hand held target includes trainee login hardware. Alternatively or additionally, in some embodiments the hand held target includes an accelerometer, a clock and an altimeter; wherein the clock time stamps the trainee instructions, accelerometer data and altimeter data. Alternatively or additionally, in some embodiments the hand held target includes a trainer user interface designed and configured to present trainer instructions to a trainer holding the target in accord with the digitally formatted performance template. Alternatively or additionally, in some embodiments the trainee user interface is configured to provide audible cues.

In some exemplary embodiments of the invention there is provided a computerized system including: (a) a relational database of trainee IDs, digitally formatted performance templates and performance data from the trainees trained using the performance templates; (b) a channel of communication receiving data from a plurality of handheld targets; and (c) a search engine configured to receive and respond to queries based on trainee ID and/or performance templates.

In some exemplary embodiments of the invention there is provided a personalized avatar including: (a) a digital graphic representation of a trainee; and (b) an animation engine for the digital graphic representation, the animation engine powered by performance data of the trainee in one or more performance templates.

In some exemplary embodiments of the invention there is provided a tangible machine-readable media including: (a) textual and/or graphic information identifying a specific performance template; and (b) a digitally formatted performance template including a first set of instructions to a trainer and a second set of instructions to a trainee; wherein the first set and the second set of instructions are formatted for presentation on first and second user interfaces respectively. In some exemplary embodiments of the invention, the tangible machine-readable media includes data transfer hardware.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

For purposes of this specification and the accompanying claims, the term "trainer" indicates any person that holds the target during presentation cues via an interface on the target.

For purposes of this specification and the accompanying claims, the term "trainee" includes anyone attempting to strike the target in response to presentation of cues via an interface on the target.

Implementation of the method and system according to embodiments of the invention involves performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 1b is a simplified schematic representation of a portion of a hand held strike target according to some exemplary embodiments of the invention;

FIG. 2 is a simplified flow diagram of a method according to some exemplary embodiments of the invention;

FIG. 5 is a mock-up of a tangible machine-readable media according to some exemplary embodiments of the invention.

DETAILED DESCRIPTION OF EMBODIMENTS

Embodiments of the invention relate to methods, equipment and systems for monitoring performance of a trainee. Specifically, some embodiments of the invention can be used to standardize performance evaluation.

The principles and operation of a methods and/or equipment and/or systems according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is illustrative, as opposed to limiting.

System Overview

Figure 1A:
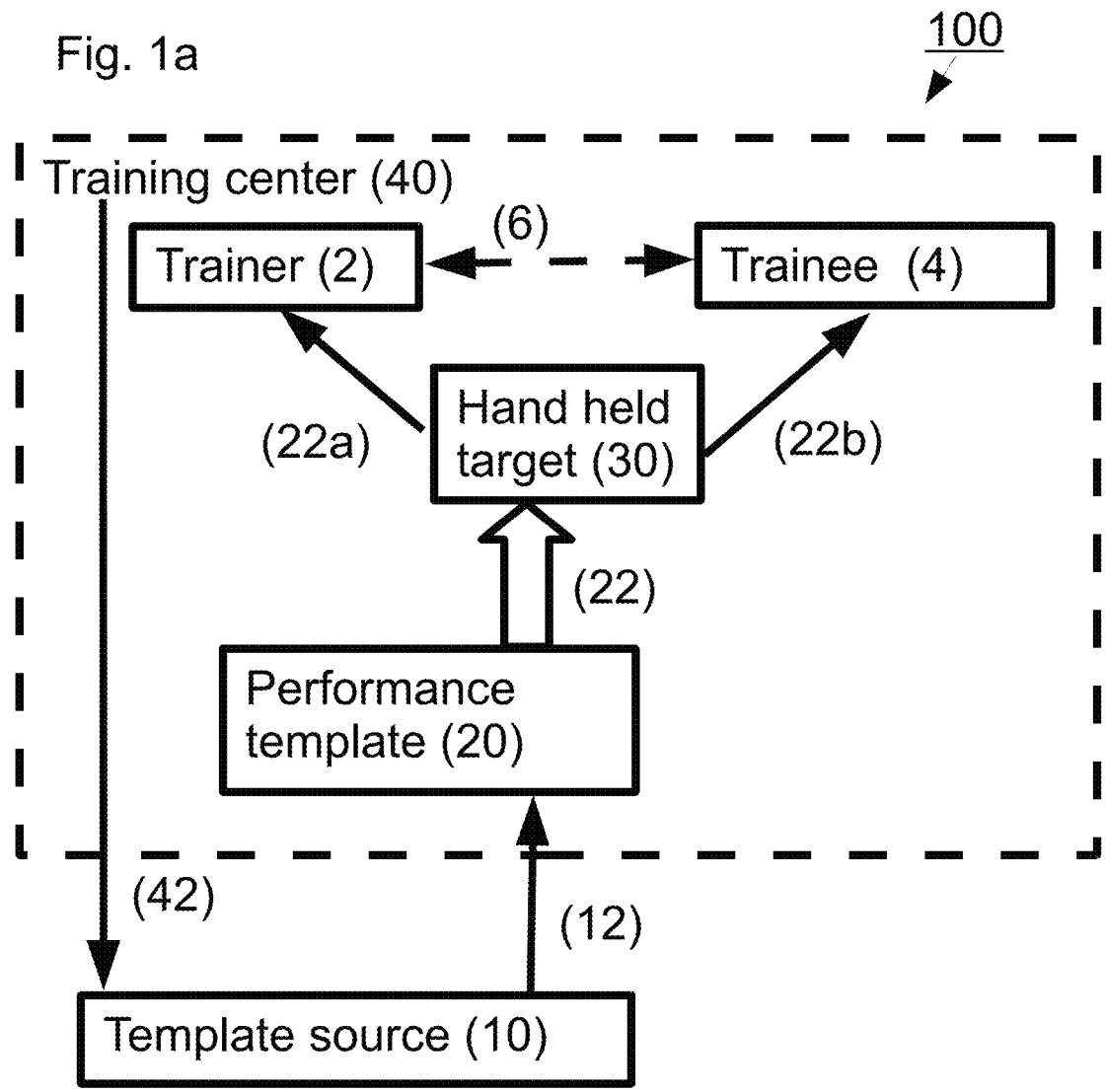
FIG. 1a is schematic system overview illustrating various exemplary embodiments of the invention.

FIG. 1a is a simplified schematic representation of a training system, indicated generally as 100. In some embodiments, use of system 100 contributes to an ability of a training center 40 to comply with requirements of a governing body. Alternatively or additionally, in some embodiments use of system 100 contributes to an ability to standardize performance data of trainees 4 from different training centers 40 to facilitate objective comparison.

In the interest of clarity a single training center 40 and a single template source 10 are depicted although system 100 might include many of each. Similarly, training center 40 is depicted as including a single hand held target, a single trainer 2 and a single trainee 4; although a typical training center 40 would include many of each. Similarly, hand held target 30 is depicted as being loaded with a single performance template 20, although many can be loaded, either serially or concurrently.

Trainer 2 and trainee 4 are not part of the system but are illustrated here because they interact with the system, as well as interacting 6 with one another.

In the depicted embodiment, a training center 40 issues a request (42) to a template source 10. According to various exemplary embodiments of the invention template sources 10, include, but are not limited to, a sports association, an acknowledged champion and a therapy practitioner. In response to request 42, template source 10 provides 12 one or more digitally coded performance templates 20 to training center 40. In some exemplary embodiments of the invention, templates 20 are provided on a tangible machine-readable media. Alternatively or additionally, in some embodiments templates 20 are transmitted across a network (e.g. internet) as digital files.

In some exemplary embodiments of the invention, templates 20 are used by loading digital instructions 22 into a computer memory in hand held target 30. According to various exemplary embodiments of the invention loading of instructions 22 is done in advance of a workout or during the workout (e.g. by Wi-Fi streaming).

Once instructions 22 are loaded 22 into hand held target 30. Trainer 2 holds target 30 and trainee 4 attempts to strike the target in accord with trainee instructions 22b delivered via target 30. Alternatively or additionally, in some embodiments trainer 2 manipulates target 30 in accord with trainer instructions 22a, which are likewise delivered via target 30.

In the depicted embodiment, interaction 6 between trainer 2 and trainee 4 is controlled, to a large degree, by target 30 through instructions 22a and 22b.

FIG. 1b is a simplified schematic representation of a handle portion of a hand held strike target (see 30 in FIG. 1), indicated generally as 31, according to some exemplary embodiments of the invention. For purposes of this specification and the accompanying claims, the terms "hand held strike target"; "hand held target" and "target" exclude pole mounted or platform mounted devices.

The depicted embodiment includes a main body 102 containing electronics components that act in concert to gather data pertaining to trainee performance during a workout specified in a digitally formatted performance template (20; FIG. 1a) stored in memory 132 of CPU 130. In addition, electronics components present cues to a trainer and/or trainee (22a and 22b respectively in FIG. 1a) via relevant user interfaces as described in more detail hereinbelow.

In the depicted embodiment, the electronics components include an accelerometer 110 providing a first data output signal 112. Signal 112 indicates strike force of a blow delivered to a strike cushion 155.

In the depicted embodiment, the electronics components also include an altimeter 120 providing a second data output signal 122. In some embodiments, an ultrasonic transducer provides altimeter function. In other exemplary embodiments of the invention, a laser range finder provides altimeter function. In some embodiments altimeter 120 is positioned in the handle so that it can send a signal 121 to, and receive a reflection 123 of that signal from, the floor. In the depicted embodiment, the handle is equipped with a rotation mechanism (indicated as dashed line R-R). According to the depicted embodiment, a trainer grasps the handle on the opposite side of line R-R from altimeter 120. The rear portion of the handle containing altimeter 120 rotates at line R-R so that signal 121 is aimed perpendicular to the floor. In some embodiments, the weight of altimeter 120 is sufficient to cause the rotation at R-R. In other exemplary embodiments of the invention, an additional weigh (not depicted) is installed to insure appropriate rotation.

In the depicted embodiment, CPU 130 receives and stores first and second data output signals 112 and 122. In some embodiments, storage is in memory 132. Alternatively or additionally, in the depicted embodiment a power source (depicted as battery 140) provides power to accelerometer 110, altimeter 120 and CPU 130. In some embodiments, CPU 130 translates digitally formatted performance template instructions (22 in FIG. 1A) into cues for a trainer and/or trainee (22a and 22b respectively in FIG. 1a) and delivers those cues via relevant user interfaces.

In some embodiments handle 31 includes a connector 150 to a strike-cushion (partially depicted as 155). In some embodiments handle 31 is integrally formed with or connected to a strike cushion (partially depicted as 155).

In the depicted embodiment, handle 31 includes a display 160. According to various exemplary embodiments of the invention, display 160 includes an LCD panel and/or LCD indicators and/or an audio output device such as a buzzer or bell. In some exemplary embodiments of the invention, display 160 functions as a trainer interface. According to these embodiments, cues 22a are presented on display 160 to indicate to a trainer when and how to move strike target 31 in accord with instructions 22 in the digitally formatted performance template 20 read by CPU 130.

In the depicted embodiment, handle 31 includes one or more wave guides 170 extending from the handle. In the depicted embodiment, handle 31 includes one or more light sources 172. In some embodiments, wave guide 170 is provided as an optical fiber. In some embodiments, the wave guide conducts light to one or more trainee facing displays 173 in strike target 155. For example, in some embodiments target 155 has a left trainee facing display and a right trainee facing display. In some embodiments, the trainee facing display comprises a translucent or transparent panel that is visibly brighter when light from source 172 propagates through wave guide 170 (e.g. an optical fiber). In some exemplary embodiments of the invention, light from light sources 172 serves as a trainee interface to present cues 22b.

In the depicted embodiment, handle 31 includes a connector 180 compatible with an external charging source. According to various exemplary embodiments of the invention, connector 180 is configured as a USB port or a DC jack. Connection of connector 180 to an external power source charges power supply 140.

In some exemplary embodiments of the invention, CPU 130 includes a clock 134 and a time stamp module 136 adapted to apply a time stamp to first data output signal 112 second data output signal 122. Alternatively or additionally, in some embodiments time stamp module 136 is adapted to apply a time stamp to instructions 22 and/or 22a and/or 22b. In some exemplary embodiments of the invention, the time stamped signals are stored in memory 132.

Alternatively or additionally, in some embodiments handle 31 includes a trainer input interface 190 positioned to receive commands from a hand holding the handle. According to various exemplary embodiments of the invention interface 190 includes a touch screen and/or pushbuttons and/or switches. In some embodiments, trainer input 190 is configured to accept a small number of input commands (e.g. "begin digitally formatted performance template"; "next template"; "previous template", "Pause" and "Stop").

Alternatively or additionally, in some embodiments trainer input via interface 190 provides a score for each exercise in the digitally formatted performance template. According to these embodiments, the scores are stored in memory 132 together with other performance data in memory 132.

In some embodiments, each exercise in the digitally formatted performance template is time stamped by time stamp module 136 and stored in memory 132. This practice contributes to an ability to evaluate a trainee in terms of delay between presentation of a trainee cue 22b (e.g. from light 172) and impact of a blow as registered by accelerometer 110 (which is also time stamped). Alternatively or additionally, this practice contributes to an ability to evaluate a trainee in terms of height (altitude) of a kick as indicated by signal 122 of altimeter 120 (which is also time stamped) for each exercise in the digitally formatted performance template read from memory 132.

In the depicted embodiment, handle 31 includes a data port 181. According to various exemplary embodiments of the invention port 181 is used for loading (see also FIG. 1a) of instructions 22 from template 20 to memory 132 in CPU 130 of target 30 and/or for log-in of a trainee 4 with a specific target 30 before a workout. Trainee login data is also stored in memory 132 of CPU 130.

In the depicted embodiment, handle 31 includes an audio output unit 183 receiving an audio output signal from CPU 130. According to various exemplary embodiments of the invention, audio output unit 183 is configured as a speaker or as a BR/EDR Bluetooth device that initially receives a connection request from a headset and subsequently transmits an audio signal to the headset.

Exemplary Method

FIG. 2 is a simplified flow diagram of a method of providing physical performance instructions, indicated generally as 200 according to some exemplary embodiments of the invention.

Depicted exemplary method 200 includes loading (210) a digitally formatted performance template into a memory of a hand held target. In some exemplary embodiments of the invention, the loaded instructions are processed by a CPU in the target to produce trainer instructions and trainee instructions (22a and 22b respectively in FIG. 1a). In other exemplary embodiments of the invention, trainer instructions and trainee instructions (22a and 22b respectively) are loaded directly and the CPU in the target simply presents them.

In the depicted embodiment, method 200 includes presenting 220 a first set of instructions to a trainer via a first user interface and presenting 230 a second set of instructions to a trainee via a second user interface as visual cues. Exemplary first and second interfaces appear as screen 160 and light 172 in FIG. 1b.

In the depicted embodiment, method 200 includes providing 240 separate visual cues to the trainer via the first user interface (e.g. screen 160). In some exemplary embodiments of the invention, these cues are different from those presented to the trainee in substance and/or timing. For example, in some embodiments a visual cue in the form of an up arrow on screen 160 until the target is raised to an appropriate height. In terms of timing, the arrow must appear on screen 160 before a visual cue is presented to the trainee indicating "strike". Cues for the trainee (e.g. via lights 172) indicate when to strike. In some embodiments, lights on left and right sides of the target visually cue the trainee which side to strike. The position of the target when the trainee cue is presented indicates the appropriate strike height. In some exemplary embodiments of the invention, different strike types are indicated by different colored lights in the trainee cue.

Alternatively or additionally, in some embodiments, method 200 includes providing 250 audio cues to the trainer via the first user interface. According to these embodiments, the first user interface includes a trainer headset receiving an audio output from audio output source 183 (FIG. 1b). According to various exemplary embodiments of the invention, the headset is wireless headset (e.g. Bluetooth) or a wired headset.

In some exemplary embodiments of the invention, loading includes data transfer employing one or more communication protocols such as Bluetooth, Near Field Contact (NFC), United Serial Bus (USB), Ethernet and Wi-Fi.

Alternatively or additionally, in some embodiments the digitally formatted performance template is provided by at least one entity including, but not limited to, a sports association, an acknowledged champion and a therapy practitioner. In some embodiments, templates provided by a specific entity are organized in sets (e.g. corresponding to belt colors of a specific martial art). In some embodiments in some embodiments, each set contains templates in a hierarchy of increasing difficulty.

In some embodiments, each template includes a series of exercises in specific order and/or with specific time sequence.

Exemplary Hand Held Target

Referring again to FIGS. 1a and 1b concurrently:

In some exemplary embodiments of the invention, a hand held target 30 includes a data port 181 in communication with a memory 132 configured to receive and store a digitally formatted performance template and a trainer user interface 160 and/or 183 designed and configured to present trainer instructions to a trainer holding the target in accord with the digitally formatted performance template. In some exemplary embodiments of the invention, the trainer user interface includes a display 160 that provides visual cues to the trainer. Alternatively or additionally, in some embodiments the trainer user interface includes an audio output interface to provide audio cues to said trainer (e.g. via a Bluetooth headset or wired headset). In some embodiments, the trainer instructions are different from trainee instructions in terms of timing and/or content. Alternatively or additionally, in some embodiments trainee instructions are relayed via the trainer. For example, a trainer receives a visual cue on screen 160 to lower the target until it reaches a height of 70 cm. When altimeter signal 122 indicates to CPU 132 that the 70 cm height has been attained, CPU 132 sends an audio signal with the words "Hiza Geri" to the trainer headset via audio interface 183. Upon hearing these words, the trainer shouts them at the trainee, who responds with a knee strike.

Alternatively or additionally, in some embodiments the hand held target according includes a trainee user interface (e.g. light 172 and waveguide 170) which provides trainee cues in accord with the digitally formatted performance template.

Alternatively or additionally, in some embodiments the hand held target according includes trainee login hardware (FIG. 1b; port 181 and CPU 132). In some exemplary embodiments of the invention, the login hardware communicates with wearable devices to effect a login. According to various exemplary embodiments of the invention, wearable devices are configured as bracelets (e.g. FIT-BIT or SAMSUNG GEAR FIT) and/or watches (e.g. APPLE watch or SAMSUNG smart watch) and/or rings and/or belts and/or as tags attachable to such items.

In some embodiments, many users log in sequentially with one, or a small number, of hand held targets. Alternatively or additionally, in some embodiments a single user logs in with several trainer held targets.

In some embodiments, the trainee log-in hardware includes near field contact (NFC) hardware. In some embodiments active NFC hardware is installed in hand held target(s) 30 (FIG. 1a; depicted as port 181 in FIG. 1b) and passive NFC hardware is installed in the wearable device(s). In other exemplary embodiments of the invention, passive NFC hardware is installed in the target(s) 30 and active NFC hardware is installed in the wearable device(s). WO 2017/046800 by the same inventors as the present application provides additional details on trainee log-in. According to various exemplary embodiments of the invention data port 181 (FIG. 1b) is compatible with Bluetooth and/or Near Field Contact (NFC) and/or United Serial Bus (USB) and/or Ethernet and/or Wi-Fi.

Additional Exemplary Hand Held Target

Referring still to FIGS. 1a and 1b concurrently:

Some exemplary embodiments of the invention relate to a hand held target 30 including a data port 181 in communication with a memory 132 configured to receive and store a digitally formatted performance template 20. In some exemplary embodiments of the invention, the template is received and stored prior to beginning of a lesson. Alternatively or additionally, the template is received and stored during a lesson (e.g. via streaming). According to these embodiments, hand held target 30 includes a trainee user interface (e.g. 172+170 and/or 183) designed and configured to present trainee instructions to a trainee in accord with digitally formatted performance template 20. In some embodiments hand held target 30 includes trainee login hardware as described hereinabove.

In some exemplary embodiments of the invention, hand held target 30 includes an accelerometer 110, a clock 134 and an altimeter 120. According to these embodiments, time stamp module 136 applies time from clock 134 to trainee instructions 22*b*, accelerometer data 112 and altimeter data 122. In some exemplary embodiments of the invention, this time stamping of instructions 22*b*, accelerometer data 112 and altimeter data 122 contributes to an ability to log trainee responses as quadruplets (performance data/trainee ID/exercise within template and template ID). In some exemplary embodiments of the invention, cumulative logs of trainee responses are transmitted to, and stored in, a database. In some embodiments, transmission of log data is via port 181.

In some exemplary embodiments of the invention, hand held target 30 includes a trainer user interface (160 and/or 183) designed and configured to present trainer instructions to a trainer holding the target in accord with said digitally formatted performance template. Details of operation of the trainer interface appear hereinabove.

Alternatively or additionally, in some embodiments trainee user interface provides audible cues to the trainee via audio interface 183, for example by transmitting to a Bluetooth headset worn by the trainee or via a speaker in hand held target 30.

Figure 3:
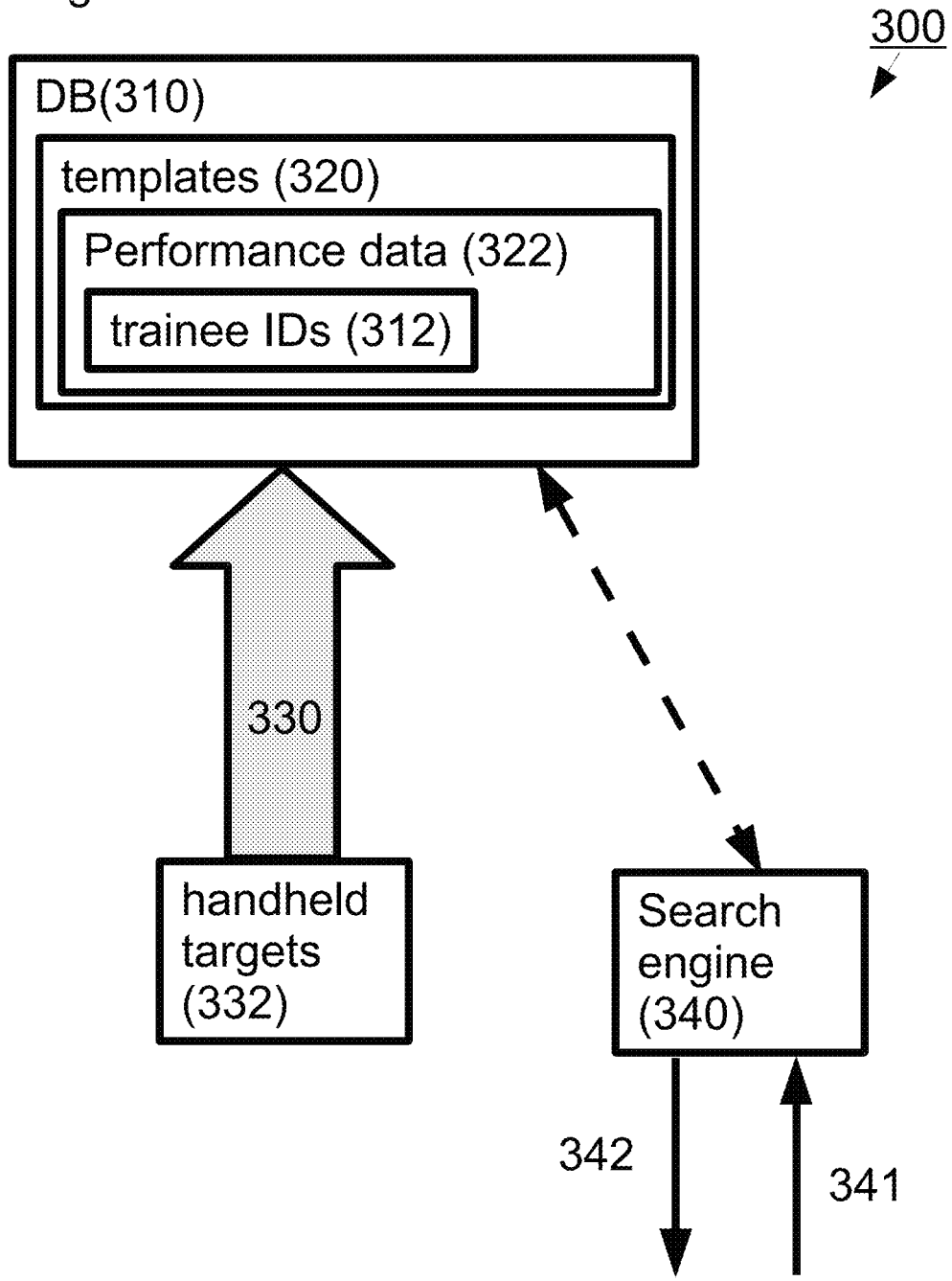
FIG. 3 is a simplified schematic representation of a data storage system according to some exemplary embodiments of the invention.

FIG. 3 is a simplified schematic representation of a data storage system, identified generally as 300, according to some exemplary embodiments of the invention. Depicted exemplary system 300 includes a relational database 310 of trainee IDs 312, digitally formatted performance templates 320 and performance data 322 from the trainees trained using performance templates 320, a channel of communication 330 receiving data from a plurality of handheld targets 332 and a search engine 340 configured to receive and respond 342 to queries 341 based on trainee ID 312 and/or performance templates 320.

In some exemplary embodiments of the invention, DB 310 is MySQL. Alternatively or additionally, in some embodiments parsing is developed in the language C. Alternatively or additionally, in some embodiments an API logic layer handles interactions between search engine 340 and dB 310.

Figure 4:
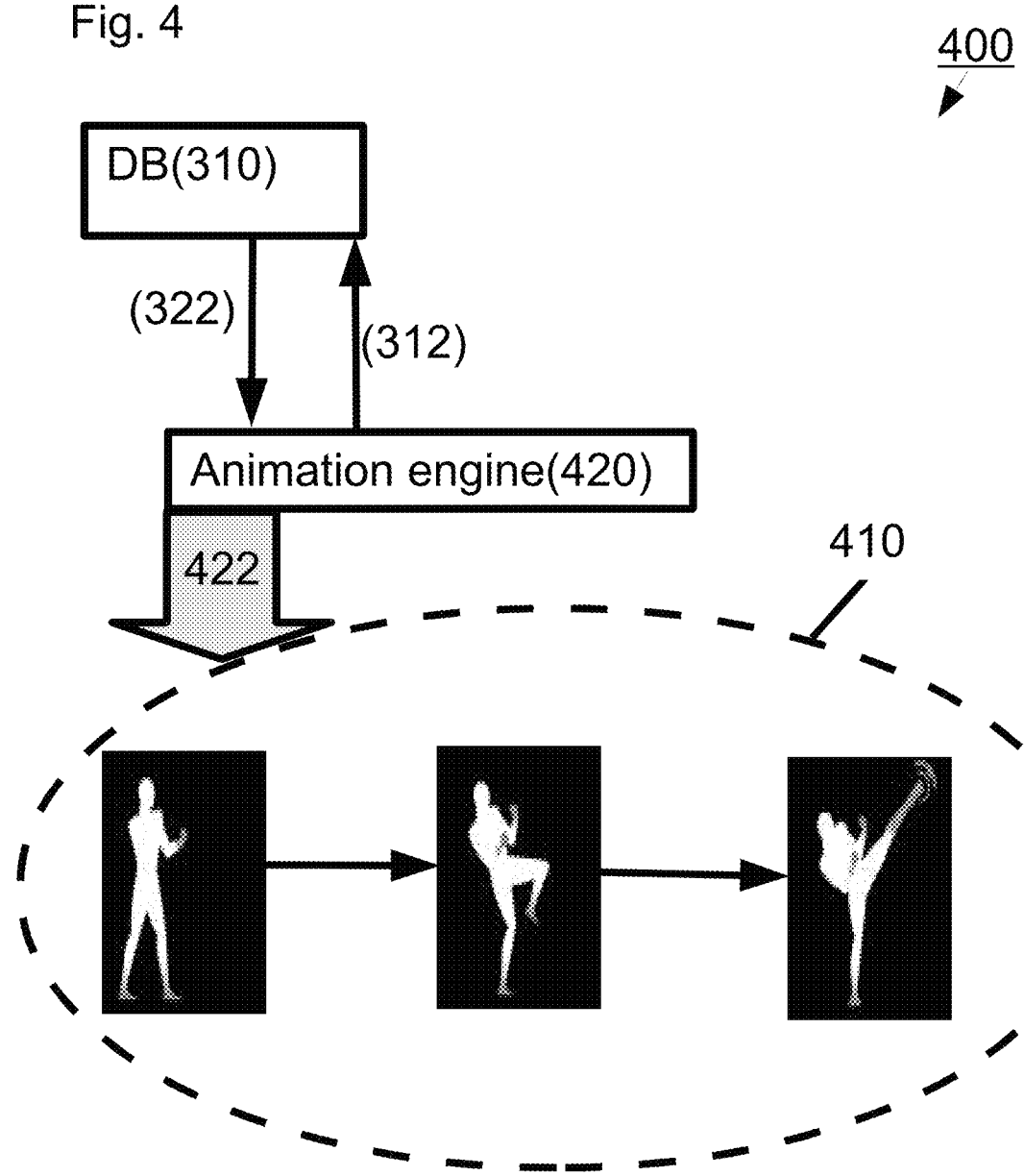
FIG. 4 is a mock-up of an avatar powered by an animation engine according to some exemplary embodiments of the invention.

FIG. 4 is a mock-up, indicated generally as 400, of an avatar powered by an animation engine according to some exemplary embodiments of the invention.

Some exemplary embodiments of the invention relate to a personalized avatar including a digital graphic representation 410 of a trainee and an animation engine 420 for digital graphic representation 410. In the depicted embodiment, animation engine 420 is powered by performance data 322 associated with a trainee ID 312 in one or more performance templates stored in DB 310.

In the figure, animation engine 420 sends a query including a specific trainee ID 312 associated with digital graphic representation 410 of that specific trainee to DB 310. In response to the query, animation engine 420 receives actual performance data 322 from a trainee log in DB 310.

Animation engine 420 uses the actual performance data 322 to formulate animation instructions 422, which are applied to digital graphic representation 410. Because the behavior of digital graphic representation 410 is based upon actual performance data 322, the animation instructions 422 change as the performance data 322 in DB 310 changes.

This means that improvement in actual performance of a specific trainee 312 is reflected in a corresponding improvement in performance of digital graphic representation 410.

In some exemplary embodiments of the invention, the UNITY engine contributes to an ability to automate personalization of a digital graphic representation 410 of a trainee.

FIG. 5 is a mock-up of a tangible machine-readable media, indicated generally as 500, according to some exemplary embodiments of the invention. The depicted tangible machine-readable media includes textual 530 and/or 532 and/or graphic 534 information identifying a specific performance template and a digitally formatted performance template comprising a first set of instructions to a trainer and a second set of instructions to a trainee. In some embodiments, the first set and said second set of instructions are formatted for presentation on first and second user interfaces respectively.

In some exemplary embodiments of the invention, the tangible machine-readable media includes data transfer hardware. In the depicted embodiment, NFC logo 540 indicates a portion of the media that should be placed close to an NFC reader to initiate data transfer. Other exemplary embodiments of the invention use other data transfer protocols (e.g. RFID) and are marked accordingly.

In the depicted embodiment, "World Karate Federation" logo 510 indicates the template source 10 (FIG. 1*a*) and logo 520 indicates the publisher of the media.

Textual information presented in box 530 indicates (from left to right) a relevant training stage (Yellow Belt), a skill level (kicks to 0.5 M) and a lesson number within a number of lessons in the training stage (1 of 10).

Exemplary Virtual Competition

Referring again to FIGS. 1 and 3, some embodiments of the invention relate to a virtual competition. In a virtual competition a same digitally formatted performance template 20 (FIG. 1) is loaded into a memory of a plurality of hand held targets 30 at multiple locations (e.g. training centers 40). Performance data 322 (FIG. 3) is then gathered (e.g.in DB 310) from individual competitors (e.g trainees 4; FIG. 1) performing said same digitally formatted template 20 at the multiple locations 40 during a discrete time interval. According to these embodiments search engine 340 responds to a query 341 defining all trainee IDs 312 registered in the competition and a specific template 320 (e.g. 2019 California Championship; green belt) by providing an output 342 of performance data 322 of at least some of the individual competitors sorted by rank and trainee ID 312 at the multiple locations 40 on a common display. According to various exemplary embodiments of the invention the common display is available via an app on a smart phone or tablet and/or on display panels at multiple locations 40.

Exemplary Size and Weigh Constraints

Referring again to FIG. 1*b*, altimeter 120, accelerometer 110, CPU 130 and power source 140 are all installed in handle 31 of the target. Since handle 31 is to be held, and moved, by a trainer during a training session, this imposes size and weight limitations on each of the components.

For that reason, commercially available components weighing 1, 2, 5, 7 or 10 grams each, or intermediate or lesser numbers of grams, are optionally selected for use in the context of various embodiments of the invention.

For example, in some embodiments the aggregate weight of altimeter 120, accelerometer 110, CPU 130 and power source 140 is less than 50 grams, less than 40 grams, less than 30 grams, less than 20 grams or less than 10 grams or intermediate or lesser number of grams.

Exemplary Power Source Constraints

In some embodiments, power source 140 is a battery. In addition to the weight constraints discussed above, the battery must have sufficient life to power other components through a training session of 10 minutes, 20 minutes, 30 minutes, 40 minutes, 50 minutes or 60 minutes or intermediate or greater lengths of time.

Alternatively or additionally, batteries with short recharge times relative to the length of a training session are used in some embodiments. For example, a trainer performing 60 minute training sessions can work indefinitely with two tae kwon do paddles equipped with handles 31 if the recharge time for power source 140 is less than 60 minutes. According to these embodiments, the trainer switches the paddle in her hand for the paddle in the charger at the end of each session.

Alternatively or additionally, in some embodiments configuration of other components of the system contribute to an extension in battery life.

For example, use of low power elements such as LEDs in display 160 and/or light source 172 contributes to a reduction in power consumption that extends battery life. Alternatively or additionally, in some embodiments light source 172 is configured with a duty cycle of less than 100% to further reduce power consumption.

Alternatively or additionally, for example if altimeter 120 transmits signal 122 only in response to an input from user interface 190, power consumption by the altimeter is reduced, contributing to an increase in battery life.

Exemplary Commercially Available Hardware

One example of a commercially available altimeter 120 suitable for use in the context of exemplary embodiments of the invention is TEXAS INSTRUMENTS—PGA450TPWRQ1 (TEXAS INSTRUMENTS; USA). The PGA450-Q1 device is a fully integrated system-on-a-chip analog front-end for ultrasonic sensing and distance measurements.

One example of a commercially available accelerometer 110 suitable for use in the context of exemplary embodiments of the invention is STMICROELECTRONICS LIS3DHTR. The LIS3DH is an ultra low-power high performance three axes nano accelerometer featuring digital PC/SPI serial interface standard output. The LIS3DH three axes accelerometer features ultra low-power operational modes that allow advanced power saving and smart embedded functions. The LIS3DH accelerometer has dynamically user selectable full scales of ±2 g/±4 g/±8 g/±16 g and is capable of measuring applications with output data rates from 1 Hz to 5 kHz.

One example of a commercially available CPU 130 suitable for use in the context of exemplary embodiments of the invention is STMICROELECTRONICS—STM32L152V8T6-A. This Ultra-Low-Power MCU is ARM® Cortex®-M3-based STM32 using ST's ultra-low-leakage process technology with an innovative autonomous dynamic voltage scaling and 5 low-power modes offering platform flexibility to fit any application.

One example of a commercially available power source 140 suitable for use in the context of exemplary embodiments of the invention is a SOSHINE RCR123-3.7-700 (SOSHINE, Shenzhen, P. R China). This battery provides 700 mAh at 3.7 Volts for up to 6 hours with a recharge time of 2 hours.

Exemplary Data Formatting Considerations

Referring again to FIG. 1*a*, in many cases there is a difference between instructions 22 as supplied by template source 10, and trainer instructions 22*a*, and trainee instructions 22*b*. In some embodiments, instructions 22 are encoded in template 20 and translated to 22*a* and 22*b* by CPU 130. In other exemplary embodiments of the invention, template 20 includes instructions 22*a* and 22*b* and CPU 130 simply reads and executes them.

The formatting differences are apparent from the following tables:

TABLE 1 first example of translation of template instructions into trainer and trainee instructions

| | Temp. instr. 22 | | Trainer instr. 22a | | | Trainee instr. 22b | | | |
|---|---|---|---|---|---|---|---|---|---|
| Item | Time (s) | action | Time (s) | Visual cue | Time (s) | Aud. Cue (opt.) | Time (s) | Visual cue | Time (s) | Aud. Cue (opt.) |
| 1st | 05 | Ashi Barai (left) | 02 | 20 cm Left Real | 3.5 | Ashi Barai (left) | 4.5 | Left light | 4.5 | Ashi Barai |
| 2nd | 10 | Fumikomi (right) | 07 | 40 cm Left Fake | 8.5 | Fumikomi (right) | 9.5 | right light | 9.5 | Fumikomi |
| 3rd | 15 | Gedan Mawashi Gen (left) | 12 | 50 cm Right Real | 13.5 | Gedan Mawashi Geri (left) | 14.5 | Left light | 14.5 | Gedan Mawashi Geri |
| 4th | 20 | Hiza Geri (right) | 17 | 70 cm Right Real | 18.5 | Hiza Geri (right) | 19.5 | right light | 19.5 | Hiza Geri |

The differences between instructions 22 as supplied by template source 10, and trainer instructions 22*a*/trainee instructions 22*b* present a new objective technical problem to be solved in order to implement performance templates 20 via hand held targets 30.

TABLE 2 second example of translation of template instructions into trainer and trainee instructions

| | Temp. instr. 22 | | Trainer instr. 22a | | | Trainee instr. 22b | | | |
|---|---|---|---|---|---|---|---|---|---|
| Item | Time (s) | action | Time (s) | Visual cue | Time (s) | Aud. Cue (opt.) | Time (s) | Visual cue | Time (s) | Aud. Cue (opt.) |
| 1st | 05 | Ashi Barai (left) | 02 | 20 cm Left Real | 3.5 | Ashi Barai (left) | 4.5 | Left light | 4.5 | Ashi Barai |

TABLE 2-continued second example of translation of template instructions into trainer and trainee instructions

| | Temp. instr. 22 | | Trainer instr. 22a | | | | Trainee instr. 22b | | |
|---|---|---|---|---|---|---|---|---|---|
| Item | Time (s) | action | Time (s) | Visual cue | Time (s) | Aud. Cue (opt.) | Time (s) | Visual cue | Time (s) | Aud. Cue (opt.) |
| 2nd | 10 | Ashi Barai (left) | 07 | 20 cm Left Fake | 8.5 | Ashi Barai (left) | 9.5 | right light | 9.5 | Ashi Barai |
| 3rd | 15 | Ashi Barai (left) | 12 | 20 cm Right Real | 13.5 | Ashi Barai (left) | 14.5 | Left light | 14.5 | Ashi Barai |
| 4th | 20 | Ashi Barai (left) | 17 | 20 cm Right Real | 18.5 | Ashi Barai (left) | 19.5 | right light | 19.5 | Ashi Barai |

Exemplary Feedback System

Referring again to FIG. 1a, in some embodiments a feedback system provides output to trainer 2 and/or trainee 4 (FIG. 1a). The full process includes instructions 22 and performance. Instructions 22 are visual and/or audible and are provided to trainer 2 and/or trainee 4 as 22a and 22b respectively as detailed hereinabove.

Performance refers to action of the trainee 4 in response to instructions 22b.

The optional feedback system relates to the entire process.
1. Before the instruction (B1);
2. At the time of the instruction (B2); and
3. After trainee response (B3).

Macro of full process for trainer 2

| trainer 2 | | |
|---|---|---|
| B1 | B2 | B3 |

Macro of full process for trainee 4

| trainee 4 | | |
|---|---|---|
| B1 | B2 | B3 |

Feedback types:
1. F1 (announcement)—indication and instruction for a future action
2. F2 (performance signal)—call to action which persists until the action is completed
3. F3 (report)-indication of completed action
4. F4 (recommendation)—indication of conclusion or rating of completed action Examples of different situations for the feedback system Example 1

| trainer 2 | | |
|---|---|---|
| B1 | B2 | B3 |
| F1 | F2 | F3, F4 |
| trainee 4 | | |
| B1 | B2 | B3 |
| | F2 | F3, F4 |

Example 2

| trainer 2 | | |
|---|---|---|
| B1 | B2 | B3 |
| F1 | F2 | F3 |
| trainee 4 | | |
| B1 | B2 | B3 |
| | F2 | F3 |

Example 3

| trainer 2 | | |
|---|---|---|
| B1 | B2 | B3 |
| F1 | F2 | F3 |
| trainee 4 | | |
| B1 | B2 | B3 |
| | F2 | |

Example 4

| trainer 2 | | |
|---|---|---|
| B1 | B2 | B3 |
| F1 | F2 | F3 |
| trainee 4 | | |
| B1 | B2 | B3 |
| F1 | F2 | |

Example 5

| trainer 2 | | |
|---|---|---|
| B1 | B2 | B3 |
| F1 | F2 | F3 |
| trainee 4 | | |
| B1 | B2 | B3 |
| F1 | F2 | F3, F4 |

According to various exemplary embodiments of the invention, instructions 22 (22a and/or 22b) provide F1 and F2. Alternatively or additionally F3 and F4 are provided by CPU 130 in response to signals 112 and/or 122 (see FIG. 1b).

Exemplary Advantages

Referring again to FIG. 1a, in some embodiments preparation and review of a user log file based on a standardized performance template 20 as described hereinabove contributes to an increase in objectivity of evaluation of trainee performance. For example, the user log file clearly indicate limitations on strike height and/or a tendency to tire after a certain amount of time and/or differences in performance between right side and left side. Use of the same template in different training centers 40 contributes to an ability to make direct comparisons between log files for trainees 4 from different training centers 40. An increase in reliability of direct comparisons between log files for trainees 4 from different training centers 40 is useful, for example, in seeding competitors for a competition and/or in identifying well matched opponents for a spectator event.

Referring again to FIG. 4, alternatively or additionally, in some embodiments changers in a user log file as described hereinabove for the same user over a period of time contributes to an ability to accurately reflect user skill in an animated Avatar.

It is expected that during the life of this patent, many new communication protocols will be developed and the scope of the invention is intended to include all such new technologies a priori.

Alternatively or additionally, It is expected that during the life of this patent many new batteries, altimeters and accelerometers will be developed and the scope of the invention is intended to include all such new technologies a priori.

Although the invention has been described in conjunction with specific embodiments thereof, it is evident that many alternatives, modifications and variations will be apparent to those skilled in the art. Accordingly, it embrace all such alternatives, modifications and variations that fall within the scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove are combined in all possible combinations and sub-combinations to produce additional embodiments of the invention. The examples given above are illustrative in nature and do not limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

Alternatively or additionally, various exemplary embodiments of the invention exclude any specific feature, part, component, module, process or element which is not specifically disclosed herein.

Specifically, the invention is described in the context of martial arts but might also be used in treatment and/or monitoring and/or diagnosis of cognitive or behavioral problems.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. A virtual competition comprising:
    (a) loading a same digitally formatted performance template into a memory of a plurality of hand held targets at multiple locations, wherein a hand held target of said plurality of hand held targets comprises:
        a data port in communication with a memory configured to receive and store a digitally formatted performance template;
        a trainer user interface designed and configured to present trainer instructions to a trainer holding the target in accord with said digitally formatted performance template;
        a trainee interface to provide trainee cues in accordance with said digitally formatted performance template;
        at least one wave guide configured to conduct light from a light source to said trainee interface; and
        an animation engine configured to formulate animation instructions, which are applied to a digital graphic representation of the trainee based upon actual performance data;
    (b) gathering performance data from individual competitors performing said same digitally formatted template at said multiple locations during a discrete time interval; and
    (c) presenting said performance data of at least some of said individual competitors at said multiple locations on a common display.

2. A virtual competition according to claim 1, wherein said common display is available via an app on a smart phone or tablet.

3. A virtual competition according to claim 1, wherein said common display is available on display panels at said multiple locations.

* * * * *